Patented June 5, 1934

1,962,084

UNITED STATES PATENT OFFICE 1,962,084

INTERMEDIATES AND DYESTUFFS OF THE ANTHRAQUINONE SERIES

Paul Nawiasky, Ludwigshafen - on - the - Rhine, Berthold Stein, Mannheim, and Anton Vilsmeier, Ludwigshafen-on-the-Rhine, Germany, assignors to General Aniline Works, Inc., New York, N. Y., a corporation of Delaware No Drawing. Original application December 3, 1931, Serial No. 578,840. Divided and this application December 6, 1932, Serial No. 646,022. In Germany December 11, 1930

7 Claims. (Cl. 260—60)

The present invention relates to intermediates and dyestuffs of the anthraquinone series and process of producing same.

We have found that valuable anthraquinone derivatives are obtained by heating with copper or cuprous chloride 2-amino-anthraquinones containing in the 1-position a halogen atom or a diazo group and in which both of the hydrogen atoms of the amino group are replaced by the carbonyl groups of a dicarboxylic acid, the said anthraquinones corresponding to the general formula:

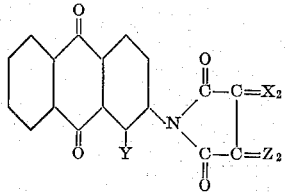

in which $X_2$ and $Z_2$ each stand for two hydrogen atoms or for one carbon atom, $X_2$, $Z_2$ and the two carbon atoms connected therewith being members of the same nucleus of an aromatic compound which may be substituted, Y stands for halogen or the diazo group, and in which the anthraquinone nucleus may be substituted. The anthraquinone nucleus in the said compounds may be substituted by alkyl groups, for example methyl, ethyl, propyl, butyl and their isomeric groups, by hydroxy, alkoxy, aryloxy or acylamino groups, or by halogen, viz. chlorine and bromine, in the beta-position. These compounds may be obtained by heating 1-halogen-2-aminoanthraquinones with succinic acid anhydride or with aromatic ortho dicarboxylic acid anhydrides or its substitution products, such as for example the anhydrides of phthalic acid, or naphthalene ortho-dicarboxylic acids, preferably in the presence of halides, such as for example ferric chloride, zinc chloride, phosphorus pentachloride and the corresponding bromides. The said aromatic dicarboxylic acid anhydrides may be substituted by methyl or nitro groups or by chlorine. The corresponding diazo compounds may be prepared by the same method by starting from 1-nitro-2-amino-anthraquinones reducing the nitro group after condensation with the anhydride and diazotizing the amino group, or by acting on the condensation products of 1-halogen-2-aminoanthraquinones and the aforesaid dicarboxylic acid anhydrides with a toluenesulphonic acid amide, splitting off the toluenesulphonic acid by dissolution in concentrated sulphuric acid at about room temperature and diazotizing the product in the said solution.

The condensation of the 1-halogen-2-dicarboxylimidoanthraquinones by means of copper is preferably carried out in an organic solvent, especially in such solvents as have a high boiling point, for example substituted benzenes, such as halogenated and nitrated benzenes and homologues thereof, naphthalene and its alkyl, halogen and nitro derivatives, diphenyl and its derivatives, paraffin oils and the like. The corresponding diazo compounds are condensed by means of cuprous chloride in water or a dilute acid, for example acetic acid and sulphuric acid. The resulting compounds which are 1.1'-dianthraquinonyl derivatives, are, generally speaking, difficultly soluble in organic solvents and more or less colored. They are important initial materials for the preparation of dyestuffs into which they are converted by a process which comprises saponification.

Saponification of the beforedescribed condensation products is effected by causing them to react with basic or acid saponifying agents, but the saponification can take place in different ways. Thus the ring formed by the dicarboxylic acid radicle and the nitrogen atom can only be split up with the formation of an acylamino compound containing in the acyl radicle a carboxylic group, or the dicarboxylic acid can be split off completely with the formation of the free amine, or the complete saponification can take place simultaneously with condensation to dyestuffs of the flavanthrone series. The exact conditions under which the one or other kind of saponification takes place cannot be given, since the specific saponification occurring depends not only on the kind of saponifying agent employed, whether acid or alkaline, but also on its concentration, the period of time for which the saponification is carried on and the temperature. Products in which the ring formed by the dicarboxylic acid radicle and the nitrogen atom is split up with the formation of acylamino compounds are obtained when carrying out saponification with alkaline agents not merely diluted with water, but also with organic diluents, such as for example alcohols, and at temperatures which, generally speaking, should not exceed 80° C. The free amines are preferentially obtained by saponification with substitution products of ammonia, such as for example hydrazine hydrate and ethylenediamine, in organic solvents, in particular such as are miscible with water, for example pyridine, piperidine, quinoline, phenols, cresols and the like, and at temperatures between about room temperature and 50° C. Saponification and simultaneous condensation occurs by means of the aforesaid reagents when carrying on the saponification over extended periods of time and/or at higher temperatures. The use of acid saponifying agents, for example sulphuric acid and hydrochloric acid, practically always leads to simultaneous saponification and condensation. Here again the reaction can lead to different products depending on the concentration of the acid used, on the one hand to dyestuffs of the flavanthrone series and on the other hand to condensation products in which apparently one amino group is split off and replaced by a hydroxy group. This latter kind of simultaneous saponification and condensation is effected, in general, when sulphuric acid of more than 90 per cent strength is used, whereas by the employment of more dilute sulphuric acid from about 20 to 90 per cent strength and at temperatures which are the higher the more the sulphuric acid is diluted and should be above about 90° C., preferably above 150° C. with 20 per cent sulphuric acid, dyestuffs of the flavanthrone series are obtained. The differences occurring in the saponification of the condensation product of 1-chlor-2-phthalimidoanthraquinone by means of sulphuric acid of different concentration may be illustrated as follows: By the action of 96 per cent sulphuric acid on the said condensation product, a yellow product is obtained which dissolves in sulphuric acid giving a blue red coloration. When treated with alkaline hydrosulphite solution, this product becomes olive in color without passing into solution. By heating the said initial material with from 85 to 90 per cent sulphuric acid and then pouring the sulphuric acid solution into water, a compound having the character of a yellow vat dyestuff is obtained.

Simultaneous saponification and condensation of the 2.2'-dicarboxylimido-1.1'-dianthraquinonyls to dyestuffs of the flavanthrone series also take place on saponification with aqueous dilute alkaline agents at temperatures which should be at least 90° C. in order to complete the reaction in a reasonable time. The upper limit of the temperature which may be used, depends only on the stability of the initial material and the products, and may, therefore, be chosen as high as 250° C. or even higher. The application of such temperatures necessitates working under superatmospheric pressure. Dilute solutions of alkali which may be used, are for example caustic alkali solutions of from 1 to 10 per cent strength, or correspondingly diluted solutions of ammonia and derivatives thereof, such as hydrazine hydrate, ethylenediamine and the like, di-sodium and di-potassium phosphate, alkaline earth metal oxides and the like. From the foregoing it will be seen that by means of dilute alkaline, as well as acid, saponifying agents quite generally, dyestuffs of the flavanthrone series are obtained and from these agents the alkaline agents give the best results.

The partially saponified products and those completely saponified products which have not undergone condensation, may be converted into dyestuffs of the flavanthrone series under the aforedescribed conditions leading from the dicarboxylimidodianthraquinonyls to the said dyestuffs. In addition thereto the free diamines may be converted into the said dyestuffs by simply heating them, even to above their melting points, or in the presence of an organic solvent, such as for example acetic anhydride, glacial acetic acid, naphthalene and its substitution products and the like, if necessary under pressure, or by dissolving them in concentrated sulphuric acid.

The following examples will further illustrate the nature of this invention but the invention is not restricted to these examples. The parts are by weight.

*Example 1*

20 parts of succinic acid anhydride are heated to about 210° C. after the addition of 0.2 part of sublimed ferric chloride, whereupon 26 parts of 1-chlor-2-amino-anthraquinone are slowly added. The reaction mixture is heated at the said temperature until splitting off of water is completed and initial material cannot any more be detected in appreciable amounts. The reaction mixture is then poured into 60 parts of hot nitrobenzene and allowed to cool. Nearly colorless crystals of 1-chlor-2-succinimidoanthraquinone separate out on cooling. They dissolve in concentrated sulphuric acid giving a yellow solution.

*Example 2*

1 part of ferric chloride is introduced into 250 parts of phthalic acid anhydride kept at 220° C. and thereupon 100 parts of 1.3-dibrom-2-aminoanthraquinone. The temperature is then raised to about 235° and 240° C. and kept thereat until the initial anthraquinone derivative can practically no more be detected. The excess of phthalic acid anhydride is then extracted by means of boiling water, or sublimed off. The 1.3-dibrom-2-phthalimidoanthraquinone thus obtained crystallizes from nitrobenzene in yellow crystals dissolving in concentrated sulphuric acid to give a yellow solution.

When replacing the 1.3-dibrom-2-aminoanthraquinone by the equivalent amount of 1-chlor-3-methyl-2-aminoanthraquinone the 1-chlor-3-methyl-2-phthalimidoanthraquinone is obtained.

*Example 3*

A mixture of 20 parts of 1-chlor-aminoanthraquinone, 0.4 part of sublimed ferric chloride and 14 parts of phthalic acid anhydride and 120 parts of dry nitrobenzene is heated to boiling until the splitting off of water is completed. The reaction mixture is then allowed to cool and the separated pale yellow crystals are recovered in the usual way. The 1-chlor-2-phthalimidoanthraquinone thus obtained dissolves in concentrated sulphuric acid giving a pale yellow solution.

When replacing the phthalic acid anhydride by 3.6-dichlorphthalic acid anhydride 1-chlor-2-p-dichlorphthalimidoanthraquinone is obtained.

*Example 4*

40 parts of 1-chlor-2-aminoanthraquinone, 0.4 part of sublimed ferric chloride and 40 parts of nathphalene-2.3-dicarboxylic acid anhydride are heated in 300 parts of dry nitrobenzene at about 210° C. until 1-chlor-2-aminoanthraquinone cannot any more be detached. The reaction mixture is then allowed to cool, the product filtered off and washed with ethyl alcohol. The 1-chlor-2-naphthalene-2'.3'-dicarboxylimidoanthraquinone thus obtained in the form of light yellow crystals dissolves in concentrated sulphuric acid giving a yellow solution.

Example 5

10 parts of 1-chlor-2-phthalimidoanthraquinone

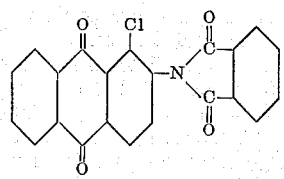

are heated with 5 parts of copper and 40 parts of naphthalene to boiling until no further increase in the amount of condensation product formed can be detected. The resulting condensation product is then freed from solvent and copper in the usual manner. The compound obtained is a yellow colored crystalline powder which dissolves in cold sulphuric acid giving a pale yellow coloration. When warmed the solution becomes an intense blue red. The product is free from chlorine. It dissolves with great difficulty in organic solvents of high boiling point and has a melting point far above 300° C.

Example 6

60 parts of 1-chlor-2-phthalimido-3-methylanthraquinone are dissolved in 120 parts of trichlorbenzene and heated to boiling with 30 parts of copper powder until initial material can no longer be detected. The whole is filtered by suction at 100° C. and the inorganic constituents are removed from the residue in the usual manner. Yellow crystal grains are obtained which crystallize from nitrobenzene in the form of beautiful greenish yellow flat prisms. They dissolve in sulphuric acid giving a yellow coloration which changes to blue red when the solution is heated. The blue red solution has a sharp spectrum and is distinguished by the fact that its color rapidly changes in sunlight. Its melting point is above 300° C.

When employing in the abovedescribed reaction 1-chlor-2-phthalimido-3-methoxyanthraquinone instead of the 3-methyl derivative described, a condensation product is obtained which is very similar in its properties to the above described product.

Example 7

30 parts of 1.3-dibrom-2-phthalimidoanthraquinone together with 10 parts of copper powder are heated to boiling for several hours in 90 parts of trichlorbenzene. The insoluble inorganic precipitate is filtered off by suction while hot and the whole allowed to cool. Beautiful pale yellow short prisms separate out from the filtrate. These dissolve in sulphuric acid giving a yellow coloration. If this yellow solution be heated to 100° C. the color changes to blue red. The melting point of the compound is above 300° C.

Example 8

10 parts of 1-chlor-2-succinimidoanthraquinone are mixed with 5 parts of copper powder and introduced into 20 parts of boiling naphthalene. The mixture is then kept boiling while stirring until unchanged 1-chlor-2-succinimidoanthraquinone is practically no longer detectable. The mixture is diluted with chlorbenzene. When the inorganic admixtures have been removed in the usual manner, the reaction product remains behind in the form of heavy yellow crystal grains. The resulting compound dissolves in concentrated sulphuric acid giving a yellow coloration. When heated this solution becomes blue red in color. The product is free from chlorine and melts above 300° C.

Example 9

6 parts of the imido compound described in Example 4 are heated to boiling with 4 parts of copper powder in 30 parts of naphthalene until no further increase in the amount of the rapidly deposited crystalline precipitate takes place. The mixture is diluted with chlorbenzene and worked up in the usual manner. The product is obtained in the form of heavy yellow needles. The compound dissolves in concentrated sulphuric acid giving a yellow coloration which changes to blue red when the solution is heated. The product is free from chlorine and melts above 300° C.

Example 10

37 parts of 1-amino-2-phthalimidoanthraquinone (obtainable by acting on 1-chlor-phthalimidoanthraquinone with p-toluenesulphonic acid amide and saponifying the product by means of sulphuric acid) are dissolved in 300 parts of concentrated sulphuric acid and diazotized by slowly introducing 7 parts of sodium nitrite, whereupon the sulphuric acid solution is poured into 2,000 parts of ice-cold water. The solution thus obtained is then run into a suspension of 25 parts of cuprous chloride in 500 parts of water kept at between 95° and 100° C. whereby nitrogen is evolved. The mixture is then boiled for a short time, the precipitate filtered off and freed from inorganic substances by boiling with dilute nitric acid. The reaction product consisting of grey yellow particles is then worked up in the usual manner. It may be freed from small amounts of impurities by recrystallization from nitrobenzene or trichlorobenzene. The product is identical with that described in Example 5.

Example 11

25 parts of the product obtainable according to Example 5 are finely divided and heated with 750 parts of 10 per cent ammonia at from 150° to 180° C. until the splitting off of dicarboxylic acid radicles is practically completed. The resulting orange yellow product is filtered off and worked up in the usual manner. It dyes cotton powerful yellow shades from a deep blue vat.

Example 12

25 parts of the initial material employed in Example 11 are heated to about 95° C. in 300 parts of a mixture of equal parts of pyridine and water with an addition of 25 parts of hydrazine hydrate while leading through air, until the splitting off of dicarboxylic acid radicles has practically finished. The working up is the same as in Example 11. The yield is excellent. The dyestuff is identical with that obtained according to Example 11.

Example 13

10 parts of the initial material employed in Example 11 are heated at from 150° to 170° C. with 400 parts of a 5 per cent solution of disodium phosphate until the splitting off of dicarboxylic acid radicles is practically completed. The working up is effected as in Example 11. The dyestuff agrees with the product described in Example 11, as regards all its properties.

Example 14

10 parts of the compound obtainable according to Example 6 are heated to 160° C. for several hours with 400 parts of a 5 per cent soda solution. In this way the greenish yellow particles are converted into fine brown red needles. These are isolated in the usual manner and dye cotton orange shades from a pure blue vat.

*Example 15*

10 parts of the compound described in Example 7 in 100 parts of ortho-dichlorbenzene are stirred at 150° C. with 10 parts of hydrazine while leading air in until the reaction is completed. In order to isolate the final product, the whole may be stirred with an alkaline hydrosulphite solution in which the product dissolves with a deep blue coloration. By leading in air, an orange colored paste is obtained which yields a blue vat from which cotton is dyed orange yellow shades.

*Example 16*

10 parts of the initial material employed in Example 11 are heated to from 150° to 170° C. with 50 parts of a 5 per cent solution of sodium carbonate until the splitting off of the dicarboxylic acid radicle is practically completed. The mixture is then worked up as described in Example 11. The dyestuff obtained corresponds with the dyestuff described in Example 11 as regards all its properties.

If the 5 per cent solution of sodium carbonate be replaced by a 1 per cent solution of caustic soda the same reaction product is obtained.

*Example 17*

10 parts of the product obtained according to Example 8 are heated in a finely divided form with 300 parts of 5 per cent caustic soda at the boiling point until the conversion of the yellowish particles of the initial material into fine yellow needles is completed. The mixture is worked up as described in Example 11. The dyestuff obtained corresponds with that described in Example 11 as regards all its properties.

*Example 18*

10 parts of the product obtained according to Example 9 are brought into a finely divided form by dissolution in cold concentrated sulphuric acid and reprecipitation by means of water and are then stirred at from 95° to 100° C. with 250 parts of a 7.5 per cent solution of caustic soda until the initial material is completely converted into fine yellow needles. The reaction product, after being worked up as described in Example 11, corresponds with the dyestuff described in the said example as regards all its properties.

*Example 19*

5 parts of the product obtainable according to Example 5 are brought into a finely divided form and stirred with 100 parts of pyridine. 3 parts of hydrazine hydrate are then added to the resulting suspension at 20° C. After a short time dissolution takes place with a slight increase in temperature and the formation of a golden brown coloration, and at the same time colorless crystals of the phthalic acid compound of hydrazine are precipitated. When initial material can practically no longer be detected, the hydrazine salt is filtered off by suction and 100 parts of water are added to the filtrate. In this manner a brilliant red intermediate product is deposited in the form of beautiful leaflets. This is converted into flavanthrene by dissolving it in concentrated sulphuric acid.

*Example 20*

10 parts of the product obtainable according to Example 5 in a finely divided form are introduced at room temperature into a mixture of 100 parts of ethyl alcohol, 100 parts of water and 10 parts of caustic soda. The suspension is warmed to between 50° and 60° C. whereby a nearly complete dissolution to an orange yellow solution takes place. The small amounts of undissolved substance are filtered off and the filtrate run into hydrochloric acid whereby an intensively yellow colored precipitate separates out. The precipitate is filtered off and washed with water. The compound thus obtained is soluble in cold dilute soda solution in contradistinction to the initial material. The yellow color of this solution changes to orange red on addition of caustic soda. On heating the orange red solution obtained for example in a 4 per cent aqueous caustic soda solution at about 95° or 100° C., the dyestuff described in Example 11 is obtained. The same dyestuff is also obtained by heating the intermediate product in dilute soda solution with dilute sulphuric acid.

*Example 21*

10 parts of the compound obtainable according to Example 5 are heated to 120° C. in 100 parts of 85 per cent sulphuric acid. In this manner the solution which is originally pure yellow becomes more reddish yellow. When no further alteration in the color can be observed, the solution is allowed to cool somewhat and then water is allowed to drop in at about 90° C. until brownish yellow crystals commence to separate out. After cooling the mixture is filtered by suction and the residue freed from acid by washing with water. In this way a brown crystal powder is obtained which is soluble in sulphuric acid of 96 per cent strength giving a reddish yellow coloration. It dyes cotton powerful yellow shades from a deep blue vat.

*Example 22*

5 parts of the compound obtainable according to Example 5 are heated to 95° C. with 75 parts of 96 per cent sulphuric acid. The yellow solution thus rapidly becomes intense blue red. When no further increase in the intensity of the coloration can be observed the mixture is allowed to cool and 25 parts of water are allowed to flow in slowly at 90° C. while stirring. In this way orange yellow needles separate out. These, after cooling completely, are filtered off by suction and washed first with 70 per cent sulphuric acid then with water and finally with methanol. The color of the crystals is thus changed to greenish yellow. It may be obtained in the form of thin yellow leaflets from pyridine in which it is soluble with difficulty. These leaflets dissolve in concentrated sulphuric acid giving a brilliant blue red coloration; the solution has a characteristic spectrum and rapidly changes in sunlight.

The leaflets are soluble in a mixture of equal parts of piperidine and water to give a currant-brown coloration; this indicates the presence of acid groups.

If, instead of stirring water into the concentrated sulphuric acid, the sulphuric acid solution be allowed to flow into 275 parts of methanol, yellow leaflets which are as good as insoluble in methanol immediately separate out. These are very similar in their properties to the reaction product separated by the addition of water but they are not soluble in a mixture of equal parts of piperidine and water. It is probable that they constitute a methylated form.

Example 23

1 part of the compound obtainable according to Example 5 is heated to 200° C. for several hours with 40 parts of concentrated hydrochloric acid. The yellow crystals of the initial material are thus converted into brown crystals. These contain chlorine and dissolve in caustic soda solution giving an intense blue coloration. The blue solution has the character of a dyestuff vat and dyes cotton yellow shades.

Example 24

3 parts of the compound obtainable according to Example 5 are heated at 200° C. with 100 parts of 20 per cent sulphuric acid until the conversion of the yellow particles of the initial material into fine orange red crystals is completed. These are isolated in the usual manner and correspond to a great extent with the compound obtainable according to Example 21 as regards their properties.

Example 25

10 parts of the compound obtainable according to Example 7 are heated at from 90° C. with 150 parts of sulphuric acid containing 96 per cent of $H_2SO_4$ until the color of the solution which is originally yellow but which gradually changes to strawberry red undergoes no further change. The mixture is allowed to cool to 40° C. and then 450 parts of methanol are stirred in. Yellow leaflets separate immediately and are isolated in the usual manner. They dissolve in concentrated sulphuric acid giving an intense strawberry red coloration; the solution has a characteristic spectrum which compared with the spectrum of the sulphuric acid solution of the compound obtainable according to Example 22 is clearly displaced towards blue. The reaction product still contains bromine and is insoluble in a mixture of equal parts of piperidine and water.

The present application is a division of our copending application Ser. No. 578,840, filed December 3rd, 1931.

What we claim is:—

1. In the manufacture of dyestuffs of the anthraquinone series the step, which comprises causing a 1.1'-dianthraquinonyl corresponding to the formula:

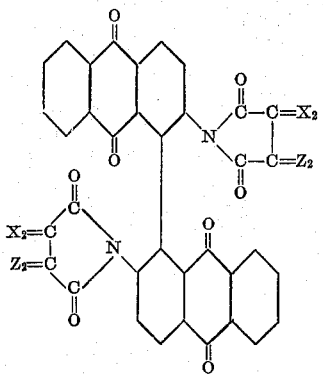

in which $X_2$ and $Z_2$ each stand for two hydrogen atoms or for one carbon atom, $X_2$, $Z_2$ and the two carbon atoms connected therewith being members of the same nucleus of a compound of the benzene or naphthalene series, in which derivatives the anthraquinone nuclei may be substituted by alkyl, hydroxy, alkoxy, or acylamino groups, and in which derivatives the free beta-positions of the anthraquinone nuclei may be occupied by chlorine or bromine, to react with a saponifying agent.

2. In the manufacture of dyestuffs of the anthraquinone series the step, which comprises causing a 1.1'-dianthraquinonyl corresponding to the formula:

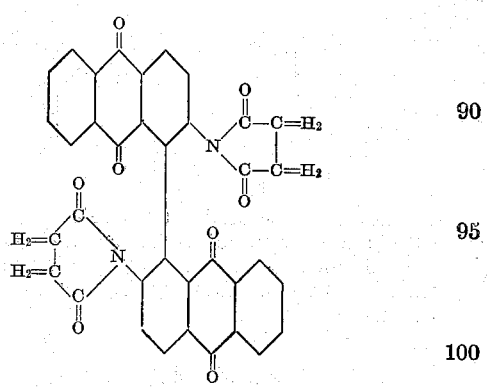

to react with a saponifying agent.

3. In the manufacture of dyestuffs of the anthraquinone series the step, which comprises heating a 1.1'-dianthraquinonyl corresponding to the formula:

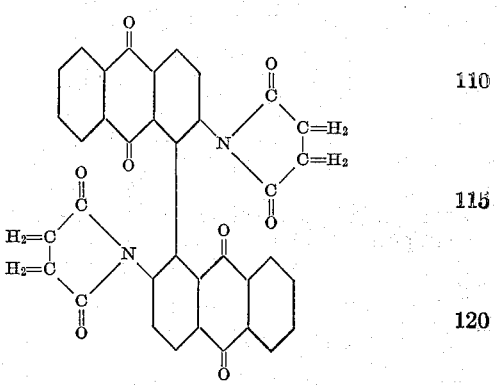

with a dilute alkaline saponifying agent at a temperature above about 90° C.

4. In the manufacture of dyestuffs of the anthraquinone series the step, which comprises heating a 1.1'-dianthraquinonyl corresponding to the formula:

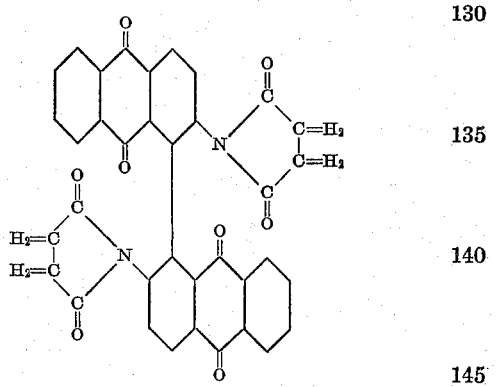

with a sulphuric acid of between 20 and 90 per cent strength at a temperature above about 90° C.

5. In the manufacture of dyestuffs of the anthraquinone series the step, which comprises causing a 1.1'-dianthraquinonyl corresponding to the formula:

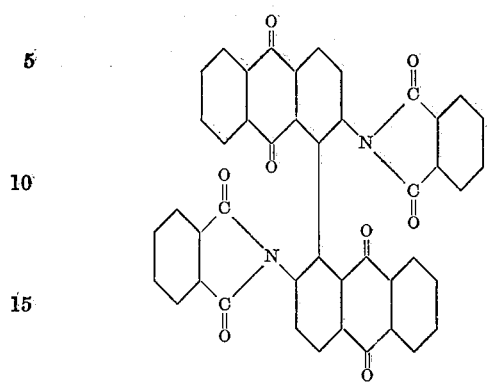

to react with a saponifying agent.

6. In the manufacture of dyestuffs of the anthraquinone series the step, which comprises heating a 1.1'-dianthraquinonyl corresponding to the formula:

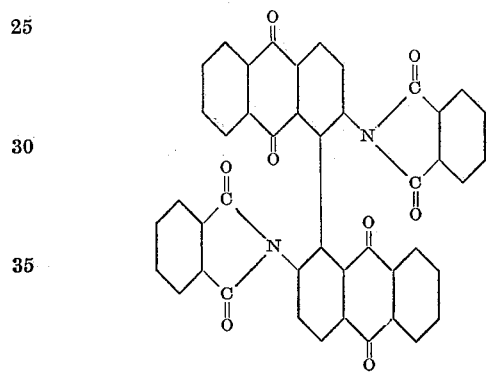

with a dilute alkaline saponifying agent at a temperature above about 90° C.

7. In the manufacture of dyestuffs of the anthraquinone series the step, which comprises heating a 1.1'-dianthraquinonyl corresponding to the formula:

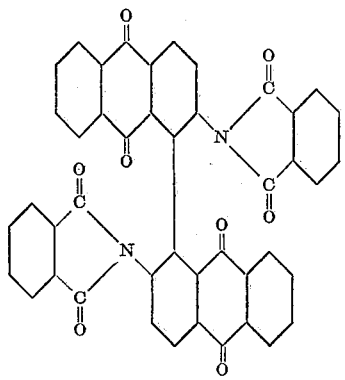

with a sulphuric acid of from 20 to 90 per cent strength at a temperature above about 90° C.

PAUL NAWIASKY.
BERTHOLD STEIN.
ANTON VILSMEIER.